United States Patent [19]

Souma et al.

[11] 4,171,037
[45] Oct. 16, 1979

[54] CAR DISC BRAKE IMPROVED IN FRICTION PAD MOUNTING

[75] Inventors: Teruo Souma; Masayoshi Katagiri, both of Toyota, Japan

[73] Assignee: Toyota Jidosha Kogyo Kabushiki Kaisha, Toyota, Japan

[21] Appl. No.: 843,940

[22] Filed: Oct. 20, 1977

[30] Foreign Application Priority Data

Jun. 30, 1977 [JP] Japan .............................. 52-86364[U]

[51] Int. Cl.² ............................................ F16D 65/00
[52] U.S. Cl. .................... 188/73.5; 188/73.6
[58] Field of Search ................... 188/73.3, 73.5, 73.6; 267/158

[56] References Cited

U.S. PATENT DOCUMENTS

| | | | |
|---|---|---|---|
| 3,612,226 | 10/1971 | Pauwels et al. | 188/73.6 X |
| 3,638,765 | 2/1972 | Flaherty et al. | 188/73.5 |
| 3,768,604 | 10/1973 | Falk | 188/73.3 |
| 3,800,923 | 4/1974 | Rike | 188/73.6 |
| 3,942,612 | 3/1976 | Marchand et al. | 188/73.6 |
| 3,990,545 | 11/1976 | Hoffmann et al. | 188/73.3 |
| 4,034,857 | 7/1977 | Kondo et al. | 188/73.3 |

FOREIGN PATENT DOCUMENTS 2649843  5/1977  Fed. Rep. of Germany .......... 188/73.6

Primary Examiner—George E. A. Halvosa
Attorney, Agent, or Firm—Stevens, Davis, Miller & Mosher

[57] ABSTRACT

A disc brake used in a car wherein a friction pad is urged onto the disc surface to restrain the movement of the disc, which disc brake, for facitating the mounting of the friction pad, is provided with (1) a backing plate of the friction pad having a notch sandwiched by two projection portions, an upper, and a lower which is smaller than the upper in projected length, on opposite upper end corners of the pad for being fitted into by a guide rail formed on a stationary member in order to allow the friction pad to slidably move in a normal direction to the disc surface; (2) a guide rail having a recess on one part thereof for allowing the lower projection portion formed smaller on the lower side of the notch to pass in a normal direction to the guide rail but not allowing the upper projection portion formed larger on the upper side of the notch to pass in the same direction; and (3) an anti-rattle spring comprising a flat body portion, an upper holding down pawl, a flange portion extending perpendicularly from the body portion, and a lower resilient pawl, which is easy to be incorporated into a complete disc brake assembly and efficient in preventing the rattling of the brake assembly.

2 Claims, 6 Drawing Figures

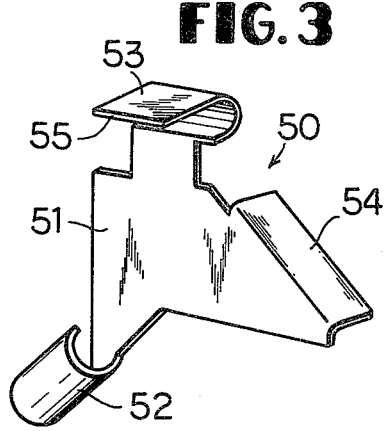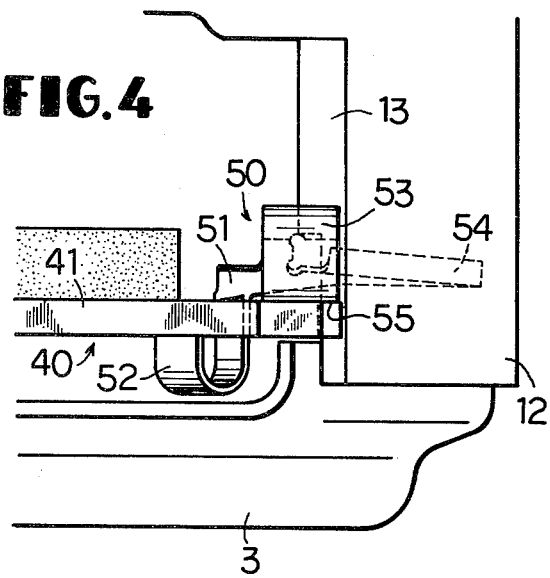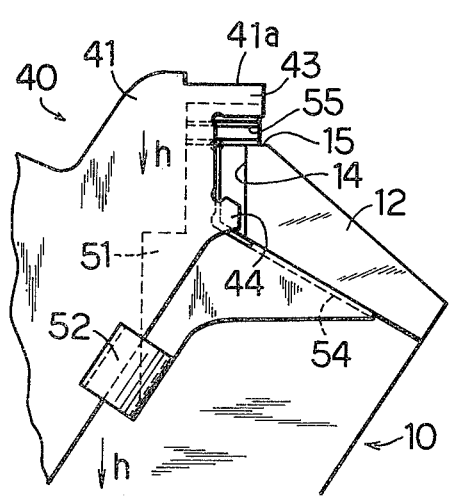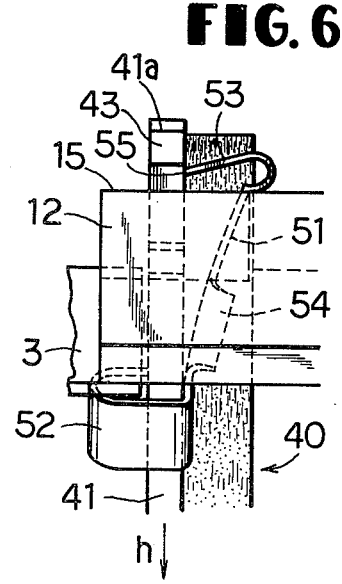

CAR DISC BRAKE IMPROVED IN FRICTION PAD MOUNTING

BACKGROUND OF THE INVENTION

The invention relates to simplification of the mounting operation of friction pads in a disc brake to a stationary member such as a mounting bracket.

In a car disc brake, a disc rotated with the wheel is generally urged on the surface thereof by the friction pads which are actuated by hydraulic cylinder(s) for restraining and finally arresting the movement of the car. The friction pads must be therefore mounted contactably to and separably from the disc.

Regarding the construction of the disc brake considered from the aspect of mounting the friction pads there have been known various types. A representative one of those having the following construction is fairly popular. The backing plate of the friction pad therein is provided on the opposite upper end corners thereof, with a notch cut in a direction toward the center line of the friction pad, which notch is fitted into by a guide rail, disposed on a stationary member such as a mounting bracket provided in a normal direction to the disc surface, for allowing the friction pad to be slidably mounted on the stationary member.

In a disc brake of the abovementioned type, mounting operation of the friction pad to a stationary member, while viewing the opposite end corners of the pad simultaneously so as to keep the relative position between the notch of the pad and the end surface of the guide rail in good alignment, is not necessarily an easy one. Especially when an anti-rattle spring, disposed between the stationary member and the friction pad for preventing the rattling of the pad, is to be mounted to the stationary member together with the friction pad, the mounting operation, which requires simultaneous alignment of the notch of the pad and the guide rail on opposite ends, becomes difficult all the more.

In an actual assembling line of the disc brake, it is possible indeed to sub-assemble the brake mechanism before mounting it to a predetermined position together with the disc for fairly reducing the difficulty of the mounting operation; in the renewal or replacing operation of a used pad, after a certain period of use, wherein the operation is usually executed without demounting the stationary member, the disc, etc., an operator is, however, often subjected to do it within a limited narrow space taking an uncomfortable posture.

SUMMARY OF THE INVENTION

It is therefore a primary object of this invention to provide a novel disc brake wherein the mounting operation of the friction pads can be easily executed without any particular difficulty.

It is another object of this invention to provide a novel disc brake wherein the mounting operation of the friction pads is extremely simplified without any drastic change of the construction design of the disc brake, consequently without any complication of the construction or rising of the manufacturing cost.

It is a further object of this invention to provide a novel disc brake wherein a pair of anti-rattle springs of unique design are smoothly incorporated together with the friction pads in an extremely simplified way.

The gist of this invention can herewith be summarized:

(1) the backing plate of the friction pad is provided, on opposite upper end corners thereof, with a notch for being fitted thereinto by a guide rail to engage with, wherein an upper projection horizontally formed on one side of the notch is larger than a lower projection horizontally formed on the other side of the notch;

(2) the guide rail, in a portion thereof, is provided with a vertical recess which permits passage of the lower projection in a perpendicular direction to the guide rail but does not permit passage of the upper projection; and (3) the anti-rattle spring of unique construction comprising a flat body portion, a flange portion extending perpendicularly from the body portion, an upper holding down pawl, and a lower resilient pawl, is effectively incorporated for preventing the rattle of the disc brake and for smooth sliding of the friction pad.

BRIEF DESCRIPTION OF THE DRAWINGS

FIG. 3 is a perspective view of an anti-rattle spring to be incorporated in the apparatus shown in FIGS. 1 and 2; and FIGS. 4 to 6 are respectively illustrative views showing the assembling operation of the apparatus wherein the backing plate is moving in the direction shown by the arrow "h" for being put in position, in which FIG. 4 is a plan view of an essential part, FIG. 5 is an elevational cross section of the essential part, and FIG. 6 is a side view of the essential part.

DETAILED DESCRIPTION OF THE PREFERRED EMBODIMENT

A preferred embodiment will be explained hereinunder with a reference to the accompanying drawings.

Figure 1:
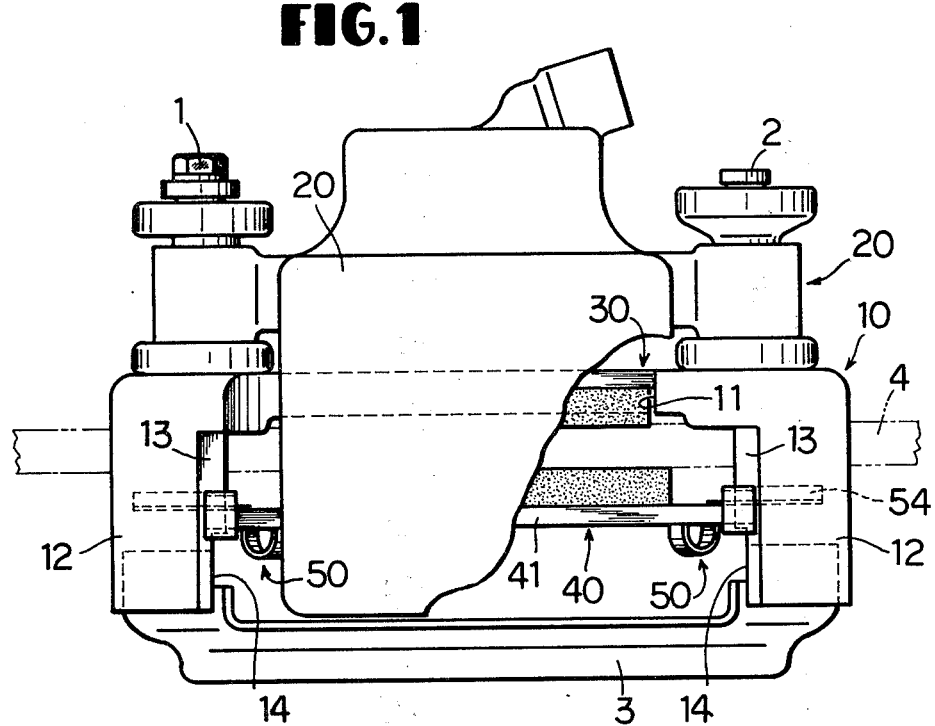
FIG. 1 is a plan view partly cut away of an embodiment.
Figure 2:
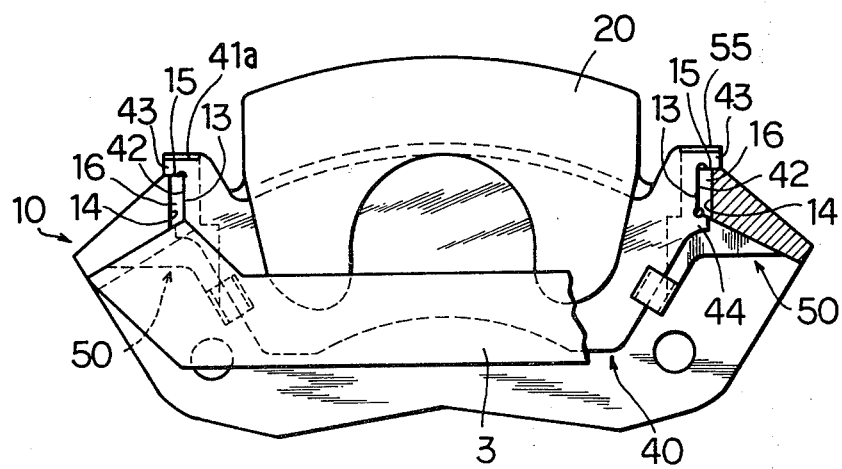
FIG. 2 is an elevational view partly cut away of the same embodiment.

In FIGS. 1 and 2 numeral 10 designates a mounting bracket, on which are disposed a pair of slide pins 1 and 2. A caliper 20 is slidably supported, by the pins 1 and 2, to the mounting bracket 10, which is provided with a notch 11 for being fitted into by one friction pad 30 to engage with on one side and with a pair of supporting arms 12, 12 parallelly disposed with a certain predetermined distance therebetween for retaining the other friction pad 40. The inside portions of the pair of supporting arms 12, 12, which are confronting each other, form a pair of guide rails 13, 13. On the other hand, the backing plate 41 of the friction pad 40 is provided with a notch 42, on opposite upper end corners thereof with a configuration and dimension for engageably fitted into by the guide rail 13. Because of the fitting engagement of the guide rail 13 into the notch 42 the friction pad 40 is slidably retained by the supporting arm 12. Between the friction pad 40 and the supporting arm 12 is mounted an anti-rattle spring 50; and the supporting arms 12, 12 are connected at each projected end thereof for the purpose of enhancement of rigidity of both.

As a result of making a notch 42 on each upper end corner of the backing plate 41 of the friction pad 40, two of the projection portions are formed on the upper and lower side of the notch 42. In this embodiment the upper projection portion 43 is formed larger than the lower one 44 for protruding in a horizontal direction. In the actual manufacturing the upper and lower projection portions may be originally formed for embracing the subsequently shaped notch between them. On the other hand, the guide rail 13 formed on the mounting bracket 10 is, on the end portion thereof, provided with a recess 14, which is so dimensioned, when the friction pad 40 shown in FIG. 2 is inserted between the supporting arms 12, 12, as to pass the lower projection portion 44 in a perpendicular direction to the guide rail 13 but not to permit the upper projection portion 43, which is larger in horizontally projected portion thereof than the lower projection portion 44, to pass there.

Then the friction pad 40 is mounted to the mounting bracket 10, therefore, providing the pad 40 is inserted from above between the pair of supporting arms 12, 12, the upper projection portion 43 comes to abut the upper surface 15 of the supporting arm 12 for rendering the relative position, in a vertical direction, of the notch 42 of the friction pad 40 and the end surface 16 of the guide rail 13 constantly or invariably fixed. It will consequently allow the operator to engage the guide rail 13 with the notch 42 only by adjusting the relative position in a horizontal direction of the two. Assembling operation of the friction pad can thus be extremely simplified by this invention.

Although the above description was made, for the sake of better understanding, in the case wherein only the friction pad 40 (including the backing plate 41) is mounted to the mounting bracket 10, it is necessary in actual assembling to mount simultaneously both the friction pad 40 and the anti-rattle spring 50. In that event the anti-rattle spring 50 may be inserted in advance into the supporting arm 12, at the position of the recess 14, before the friction pad 40 is inserted between the supporting arms 12, 12 as can be seen in FIGS. 4 to 6 which show an intermediate state of insertion respectively. At this time a part of the backing plate 41 is fitted in between the body portion 51 of the anti-rattle spring 50 and the resilient pawl 52 thereof.

In this situation the end portion 55 of a holding down pawl 53 formed at the upper portion of the anti-rattle spring 50 slidingly abuts, as shown in FIGS. 4 to 6, one surface of the backing plate 41 while, within the limit of the elastic deformation, being forcibly compressed or deflected. Further downward moving of the friction pad 40 as far as to make the upper projection 43 abut the upper surface 15 of the supporting arm 12, and allowing the holding down pawl 53 to pass by its elasticity the extremity of the vertical portion of the backing plate 41, the end portion 55 of the holding down pawl 53 finally comes to the top surface of a shouldered recess or step 41a of the backing plate 41, whereby the holding down pawl 53 is released of the deflection or compression and normally functions as a part of the anti-rattle spring. The anti-rattle spring 50 will, in this final situation, hold the backing plate 41 between the body portion 51 thereof and the lower resilient pawl 52, and hold as well, between the holding down pawl 53 and the flange portion 54, the supporting arm 12 and the upper projection portion 43 of the friction pad under a preset load; if therefore the friction pad 40 is slidingly moved as it is along the upper surface 15 of the supporting arm 12, the anti-rattle spring 50 will be moved together; and when the latter comes to the condition shown in FIG. 1 the mounting operation of the friction pad 40 and the anti-rattle spring 50 onto the mounting bracket will then naturally be finished.

The effect of simplifying the assembling operation of a disc brake, through the constant or invariable setting of the relative position in a vertical direction of the notch 42 of the friction pad and the end surface of the guide rail 13, will be observed more conspicuously when it is required to simultaneously mount the friction pad 40 and the anti-rattle spring 50 to the mounting bracket 10. It would be easily understood by only recollecting the traditional way of assembling wherein the relative position of the notch 42 and the end surface 16 of the guide rail 13 had to be carefully watched in respect of vertical and horizontal direction at a time while resisting the downward force exerted by the anti-rattle spring 50 to the friction pad 40.

In addition to the abovementioned merit, another advantage, which will be later stated, is more than negligibly important. In the event of a newly invented way of assembling where the relative position in a vertical direction of the friction pad 40 and the supporting arm 12 is invariably set or determined, an unreasonable or forcible upward lifting of the friction pad 40, after the engagement between the holding down pawl 53 of the anti-rattle spring 50 and the upper projection portion 43 of the friction pad 40, can not occur. It will allow the holding down pawl 53 to be estimated a little lower, in its elastic deformability, than the conventional one. During the operation of aligning the notch 42 of the friction pad 40 and the end surface 16 of the guide rail 13, in the conventional way of assembling, wherein an upward lifting more than necessary of the friction pad 40 against the elasticity of the anti-rattle spring 50 has inevitably occurred, which has necessitated keeping the anti-rattle spring 50 with surplus or over elastic deformability that much.

The aforementioned description relates to the attaching operation of the friction pad 40 and the anti-rattle spring 50 to the mounting bracket 10. Other operations are similar to those in the traditional way, requiring no further explanation. As earlier stated the sub-assembling of the brake mechanism in advance is usually executed before completing a disc brake by mounting it together with other parts such as a disc, which is far easier in assembling the entire system.

The renewal operation of the friction pad 40, which has been used for a certain period of time, will be described, which is considered to be more helpful in understanding of this invention. Remove first the slide pin 1, and release the friction pad 40 from the restraint of the caliper 20, by rotating the caliper 20 about the slide pin 2; slide the friction pad 40 as far as the recess 14. While deflecting the anti-rattle spring 50, release the holding down pawl 53 from the upper projection portion 43 of the friction pad 40; then the friction pad 40 may be upwardly retractable. A new friction pad 40 can be put there in lieu of the demounted one. The attaching operation in this case is identical to that earlier stated in respect with the usual manufacturing process in a production line, which does not need a further description. In this event, the mounting operation must be generally carried out while leaving the mounting bracket 10, the disc 4, etc., being fixed as they are at a respective preset position. So the operation has to be executed within a considerably narrow space, taking a fairly uncomfortable posture, which can be said much more difficult in comparison with the mounting operation in the usual production line. The effect of this invention may be proved more remarkably in this case.

A few more comments may be helpful for proving the effect of this invention.

In the above embodiment the pair of supporting arms 12, 12 are connected, at each end portion thereof, with a connecting member 3, which makes it inevitable to put the friction pad 40, from a normal direction to the guide rail, between the supporting arms 12, 12. Although it is not necessarily inevitable, in the case of a mounting bracket having no connecting member 3, it is effective all the same in facilitating the assembling operation to form a recess 14 on the end portion of the guide rail 13, to protrude the upper projection portion 43 of the friction pad 40 horizontally longer than the lower projection portion 44, and to mount the friction pad 40 from a normal direction to the guide rail 13. The mounting bracket 10, the friction pad 40, the anti-rattle spring 50, etc., are not limited to those shown in the above embodiment, but various changes and/or variations may be made, so long as they do not deviate from the spirit of this invention.

This invention exhibits, as described above in greater detail, an excellent effect in the assembling operation of the disc brake system as well as in the replacement operation of the friction pad which has been used for a certain period of time.

It has greatly enhanced the quality of the disc brake by ingeniously putting the newly improved anti-rattle spring of unique design, in the assembling, together with the friction pad.

It has dispensed with the surplus elastic deformability of the anti-rattle spring, which has hitherto been indispensable for the benefit of the assembling operation. This invention can be said to have contributed to the simplification of the design and manufacturing of the anti-rattle spring, and at the same time the newly designed anti-rattle spring has contributed to the facilitation of the disc brake assembling.

Various changes may be made without departing from the scope of the invention and the invention is not to be considered limited to what is shown in the drawings and described in the specification.

What is claimed is:

1. In a disc brake including
a rotary disc rotatable around the disc axis;
a stationary member located near said rotary disc, and provided with a pair of rod-like guide rails extending in a direction normal to said rotary disc;
a caliper having a pair of depending portions, one of which is provided with a hydraulic cylinder, mounted in such a posture as to straddle the outer periphery of said rotary disc and movable in a direction normal to said rotary disc and further removable from the straddling posture across said rotary disc in a direction parallel to said rotary disc;
a pair of friction pads disposed between said rotary disc and said caliper for being urged onto said rotary disc by said caliper, a backing plate on at least one of said pads, said backing plate being provided with a notch on each lateral end thereof for being fitted thereinto by said guide rails; said disc brake comprising:
(a) a pair of laterally protruding projection portions formed, respectively, on the backing plate on the sides of said notch remote and near from said disc axis, the projection portion formed on the remote side of the notch being larger than the other said projection portion formed on the near side of the notch; (b) a recess in a pair of said guide rail on said stationary member for permitting said near side projection portion to pass in a direction normal to said guide rail but not permitting said remote said projection portion to proceed nearer to said disc axis than the side surface level of the guide rail remote from said disc axis; and (c) a pair of anti-rattling springs which are respectively provided with an anti-rattling portion, elastically holding said remote side projection portion and said guide rail from opposite sides for preventing the separation of the two from each other, and a setting portion for sandwiching the backing plate from opposite sides, so that said anti-rattling spring may move together with said pad.

2. A disc brake in accordance with claim 1, wherein the setting portion of said anti-rattling spring comprises a plate-like body portion, which is in direct contact with a surface of said backing plate of the friction pad and a resilient pawl, integral with and spaced from the plate-like body portion, and said anti-rattling portion comprises a holding down pawl which is U-shaped with the legs of the U being substantially perpendicular to said body portion, the end of the leg of the U on the opposite side from where the same is connected to said body portion, is engaged with said backing plate for urging said remote side projection by means of the resilient force of itself against the upper side of said guide rail, and a reaction portion, integral with said body portion, and being urged against the lower surface of said guide rail by reaction to the biasing force of said holding down pawl.

* * * * *